(12) United States Patent
Martellotti

(10) Patent No.: US 9,140,280 B2
(45) Date of Patent: Sep. 22, 2015

(54) LATCH TO THE CORE FASTENER

(71) Applicant: Interplex Nascal, Inc., Tustin, CA (US)

(72) Inventor: James R. Martellotti, Tustin, CA (US)

(73) Assignee: Interplex Nascal, Inc., Tustin, CA (US)

( * ) Notice: Subject to any disclaimer, the term of this patent is extended or adjusted under 35 U.S.C. 154(b) by 0 days.

(21) Appl. No.: 14/073,330

(22) Filed: Nov. 6, 2013

(65) Prior Publication Data

US 2014/0119851 A1    May 1, 2014

Related U.S. Application Data

(63) Continuation-in-part of application No. 13/432,479, filed on Mar. 28, 2012.

(60) Provisional application No. 61/468,461, filed on Mar. 28, 2011, provisional application No. 61/722,944, filed on Nov. 6, 2012.

(51) Int. Cl.
*F16B 21/00* (2006.01)
*F16B 5/06* (2006.01)
*B65H 75/14* (2006.01)
*F16B 2/22* (2006.01)
*F16B 7/22* (2006.01)
*B65H 75/22* (2006.01)

(52) U.S. Cl.
CPC .............. *F16B 5/0664* (2013.01); *B65H 75/14* (2013.01); *B65H 75/22* (2013.01); *F16B 2/22* (2013.01); *F16B 7/22* (2013.01); *B65H 2701/51524* (2013.01); *F16B 5/0642* (2013.01)

(58) Field of Classification Search
CPC ............ F16B 5/0664; F16B 2/22; F16B 7/22; B65H 75/14; B65H 75/22

USPC ............. 411/338, 509; 24/453, 297; 242/608, 242/608.2, 608.6
IPC ....................................................... F16B 5/0621
See application file for complete search history.

(56) References Cited

U.S. PATENT DOCUMENTS

| 491,019 | A | | 1/1893 | Manson |
| 607,315 | A | | 7/1898 | Wingard |
| 709,400 | A | | 9/1902 | Fitzpatrick |
| 754,766 | A | | 3/1904 | Hanson |
| 953,298 | A | | 3/1910 | Schmidt |
| 1,691,064 | A | | 11/1928 | Hoppe |
| 2,560,110 | A | | 7/1951 | Horn |
| 2,797,605 | A | | 7/1957 | Metze, Jr. et al. |
| 4,195,794 | A | * | 4/1980 | Ricci et al. ................. 242/396.9 |
| 4,234,137 | A | * | 11/1980 | Watanabe et al. .......... 242/608.3 |
| 4,244,535 | A | * | 1/1981 | Moodie ......................... 242/609 |

(Continued)

*Primary Examiner* — Gary Estremsky
(74) *Attorney, Agent, or Firm* — Preti Flaherty Beliveau & Pachios LLP

(57) ABSTRACT

A latching system includes a hub with one or more openings defined in the hub. Each opening includes a latching feature to which a fastener is releasably coupled. The latching feature may be configured to couple to only a single fastener provided from one side of the hub. Alternately, the latching feature may be configured to couple to two fasteners, one from each side of the hub, at the same time. The fastener includes prongs that are configured to be sufficiently separated from one another, when a removal tool is inserted between them, to facilitate the release of the fastener from the latching feature and the removal of the fastener from the opening. A flange may be held in place between the hub and a portion of the coupled fastener.

34 Claims, 19 Drawing Sheets

(56) References Cited

U.S. PATENT DOCUMENTS

| | | |
|---|---|---|
| 4,604,014 A | 8/1986 | Frano |
| 4,648,738 A | 3/1987 | Thielen |
| 5,044,921 A * | 9/1991 | Micelli et al. .............. 425/451.9 |
| 5,074,696 A | 12/1991 | Tanaka |
| 5,131,711 A * | 7/1992 | Laferle ..................... 296/97.1 |
| 5,335,873 A * | 8/1994 | Harris et al. ................ 242/348 |
| 5,697,858 A | 12/1997 | Lekavich |
| 6,065,708 A * | 5/2000 | Matsubara ................ 242/388.1 |
| 6,182,922 B1 * | 2/2001 | Kazama .................... 242/608.6 |
| 6,345,946 B1 | 2/2002 | Mainini et al. |
| 6,578,240 B2 * | 6/2003 | Fortenberry ................ 24/67 R |
| 6,589,244 B1 | 7/2003 | Sevrain et al. |
| 6,808,349 B1 | 10/2004 | Boling |
| 6,843,630 B2 | 1/2005 | Sbonk |
| 6,901,646 B2 * | 6/2005 | Yoon ............................ 29/453 |
| 6,915,717 B2 | 7/2005 | Burgstaler et al. |
| 7,052,224 B2 | 5/2006 | Venus et al. |
| 7,108,444 B2 | 9/2006 | Burgstaler et al. |
| 7,257,865 B2 | 8/2007 | Kaneko et al. |
| 8,037,582 B2 | 10/2011 | Okada et al. |
| 2002/0017588 A1 * | 2/2002 | Kitayama ................ 242/608.6 |
| 2009/0314876 A1 * | 12/2009 | Kessler et al. ............ 242/608.6 |

* cited by examiner

LATCH TO THE CORE FASTENER

CROSS REFERENCE TO RELATED APPLICATIONS

This application claims the benefit under 35 U.S.C. §119 (e) of U.S. Provisional Patent Application No. 61/722,944, entitled "Latch to the Core Fastener," filed on Nov. 6, 2012, which is herein incorporated by reference in its entirety for all purposes.

This application is a continuation-in-part under 35 U.S.C. §120 of U.S. Non-Provisional patent application Ser. No. 13/432,479, entitled "Fastener," filed on Mar. 28, 2012, which application claims the benefit under 35 U.S.C. §119(e) of U.S. Provisional Patent Application No. 61/468,461, entitled "Fastener," filed on Mar. 28, 2011, each of which is herein incorporated by reference in its entirety for all purposes.

BACKGROUND OF THE INVENTION

In many component manufacturing disciplines components are manufactured and used in a continuous strip rather than as loose pieces. To facilitate the handling of those continuous strips they are put onto reels. The reels consist of a center core or hub with a flange on both sides of the core or hub. These reels are typically assembled with the two flanges and central core or hub using bolts, screws, staples or glue. There are occasions where it would be advantageous to be able to advantageous to disassemble the reel for recycling or for reuse of the reel's flanges and/or core/hub or for conserving space when shipping empty reels.

What is needed, therefore, is a reel that can withstand the forces exerted on it during the manufacturing process as well as one that can be easily disassembled.

BRIEF SUMMARY OF THE INVENTION

In one embodiment of the present invention, a coupling system includes a hub having a first latch opening with a first latching feature disposed in the first latch opening and a first fastener disposed in the first latch opening and releasably coupled to the first latching feature. The first latching feature. The first latching feature in the first latch opening may be configured to couple with a single fastener from one side or to two fasteners inserted from opposite sides.

In another embodiment, a coupling system includes a hub having first and second latch openings with first and second latching features disposed, respectively, in the first and second latch openings. First and second fasteners are disposed, respectively, in the first and second latch openings and releasably coupled to the first and second latching features. The first fastener is positioned in the first latch opening from a first side of the hub and the second fastener is positioned in the second latch opening from a second side of the hub opposite the first side of the hub.

In yet another embodiment of the present invention, a coupling system includes a latch opening disposed in a hub with a first pair of latching features disposed in the latch opening. The first pair of latching features are arranged in a first virtual plane and a second pair of latching features are also disposed in the latch opening with the second pair of latching features arranged in a second virtual plane where the first and second virtual planes intersect.

BRIEF DESCRIPTION OF THE SEVERAL VIEWS OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION OF THE INVENTION

Figure 1:
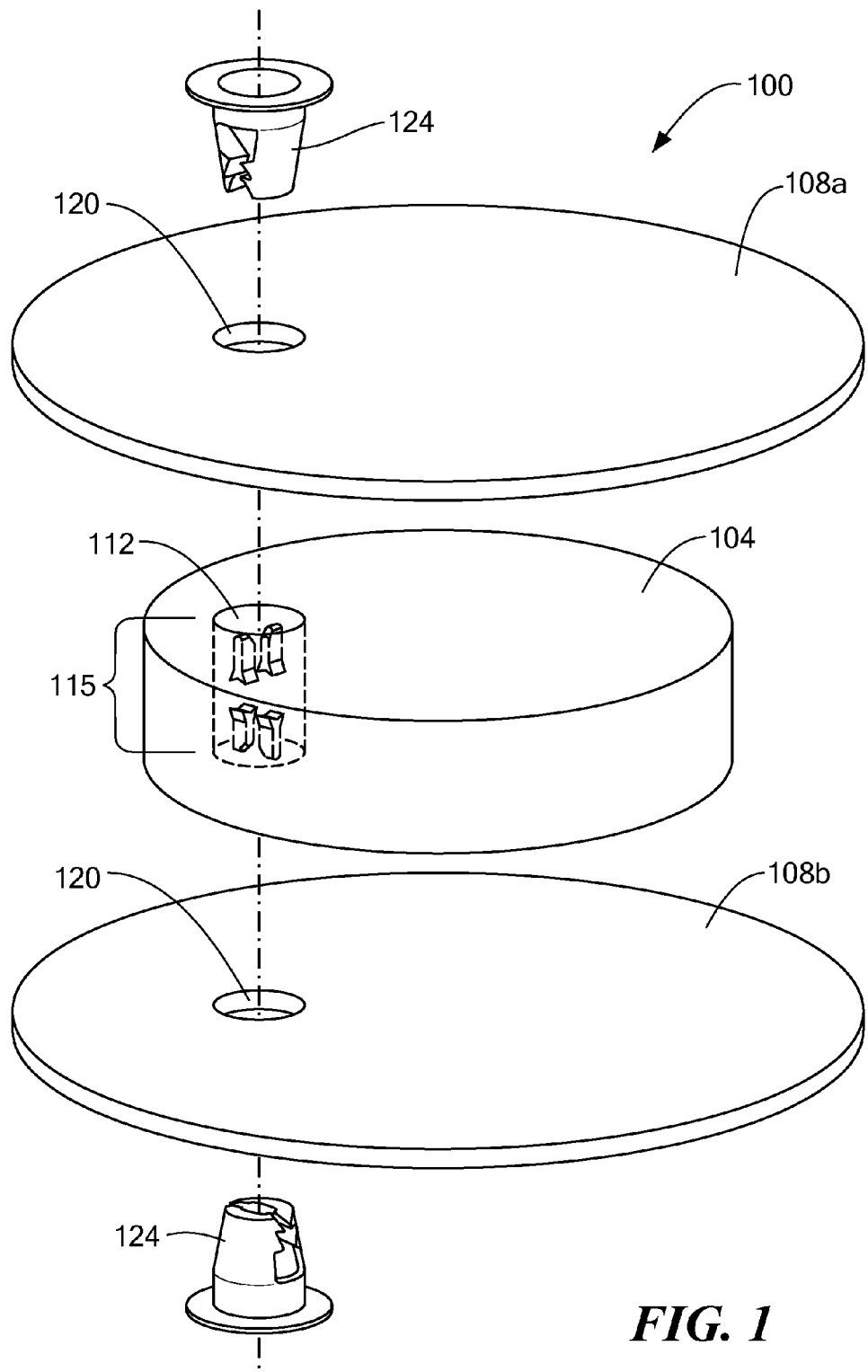
FIG. 1 is an exploded view of an assembly in accordance with an embodiment of the present invention.

This application is related to U.S. Provisional Patent Application No. 61/722,944, entitled "Latch to the Core Fastener," filed on Nov. 6, 2012, and to U.S. Non-Provisional patent application Ser. No. 14/432,479, entitled "Fastener," filed on Mar. 28, 2012, and U.S. Provisional Patent Application No. 61/468,461, entitled "Fastener," filed on Mar. 28, 2011, each of which is herein incorporated by reference in its entirety for all purposes.

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

In one embodiment of the present invention, a parts reel 100, as shown in FIG. 1, includes a hub 104, an upper flange 108a and a lower flange 108b. It should be noted that the hub may also be referred to as a core and the terms "hub," "core" and hub/core, and the like, as used in this specification, are interchangeable. The hub 104 and the flanges 108 may be made of a plastic or other suitable material. Further, the flanges may be made from stiff cardboard or other material. While the description in the present disclosure is with regard to the reel 100, this is only for explanatory purposes and not meant to be limiting in the application of the embodiments of the present invention as described and claimed herein.

The hub 104 includes a latch opening 112 extending therethrough with at least one latching feature 115 disposed within the latch opening 112. It should be noted, however, that in an alternate embodiment, the latch opening 112 need not extend all of the way through the hub 104. The upper and lower flanges 108a and 108b include at least one fastener opening 120 that is designed and located to be oriented coaxially with the latch opening 112 in the hub 104 as shown in FIG. 1. In one example, two fasteners 124 are provided, respectively, in the fastener openings 120 of each of the upper and lower flanges 108a and 108b in order to couple with the latching feature 115 such that the upper and lower flanges 108a, 108b are provided, i.e., sandwiched, in place about the hub 104.

It should be noted, however, that in some instances, the reel 100 may include only one of the flanges 108a and 108b. Of course, there may be a plurality of latch openings 112 in the hub 104 with corresponding fastener openings 120 in the upper and lower flanges 108a and 108b to accept a corresponding fastener 124 in order to provide multiple points of connection.

Figure 2A:
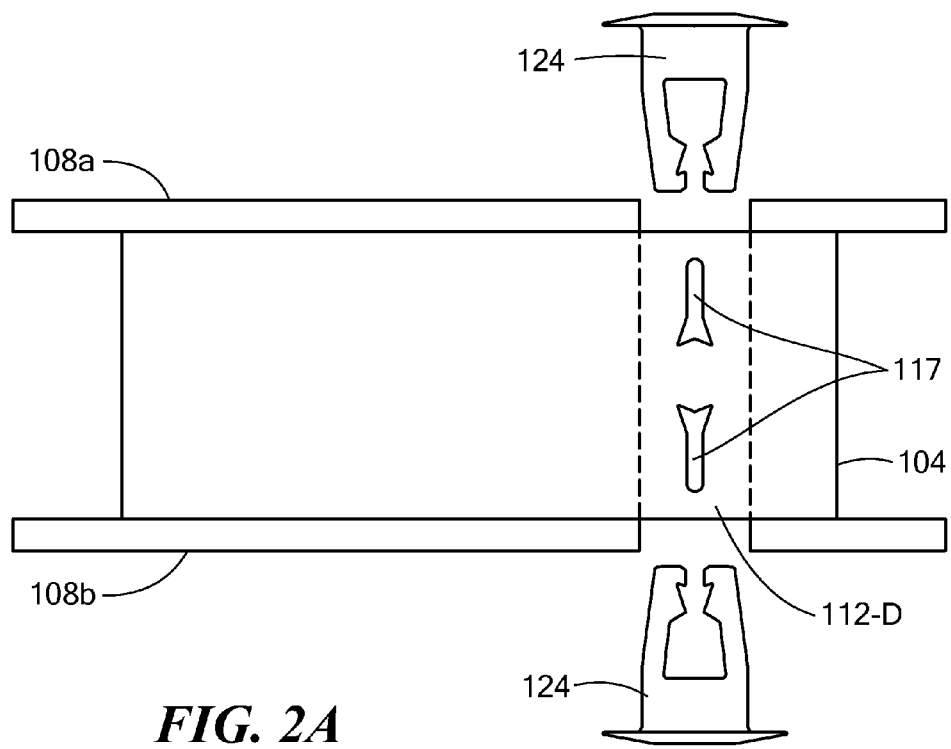
FIGS. 2A and 2B are exploded views of an embodiment of the present invention.
Figure 2B:
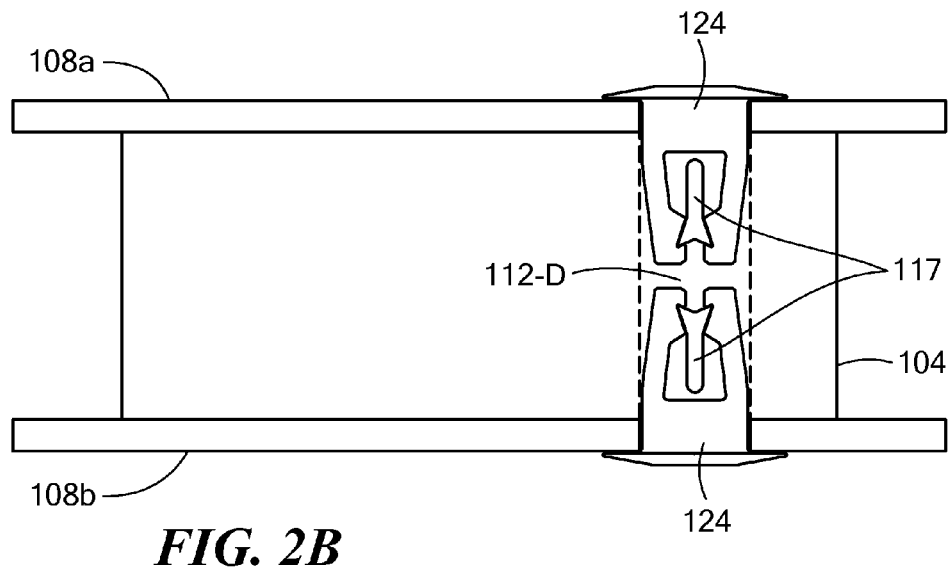

Referring now to FIGS. 2A and 2B, in one embodiment of the present invention, the latching feature 115 comprises latches 117 disposed within the latch opening 112 of the hub 104 to allow for insertion of two fasteners 124 in the opening 112, i.e., a double-ended latch opening 112-D. Each of the fasteners 124, being inserted, respectively, from the upper flange 108a and the lower flange 108b, couples with a portion of a respective latch 117 as shown in FIG. 2B in order to keep the upper and lower flanges 108a and 108b in a fixed relationship with the hub 104. The structure of the cooperating parts of the fastener 124 and the latches 117 will be described in more detail below.

Figure 3A:
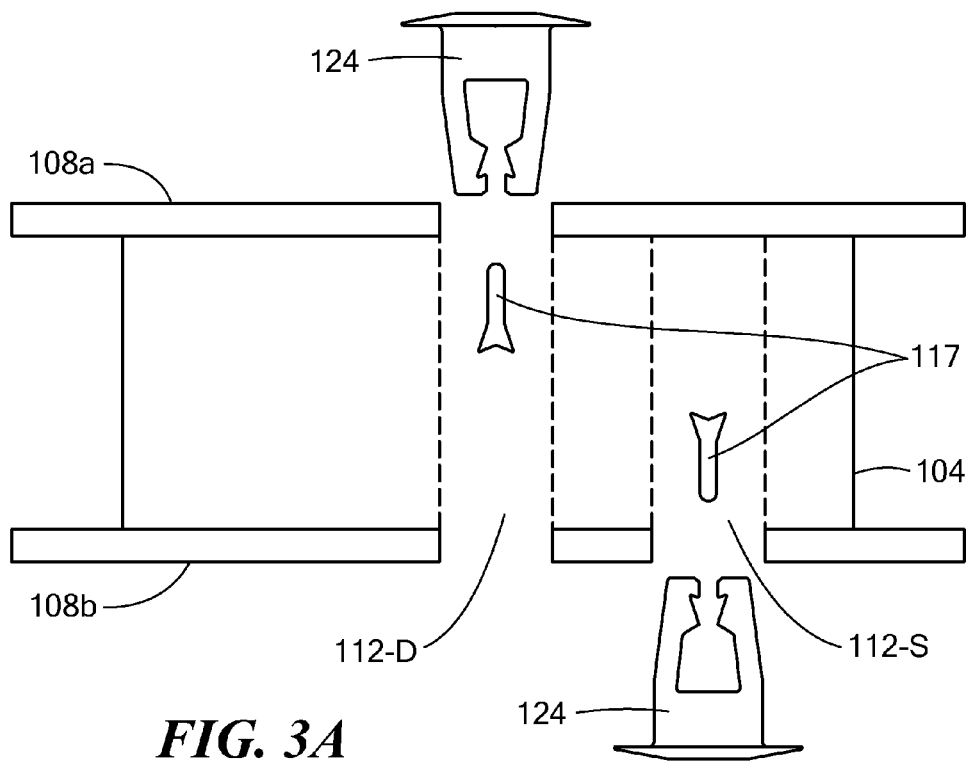
FIGS. 3A and 3B are exploded views of an embodiment of the present invention.
Figure 3B:
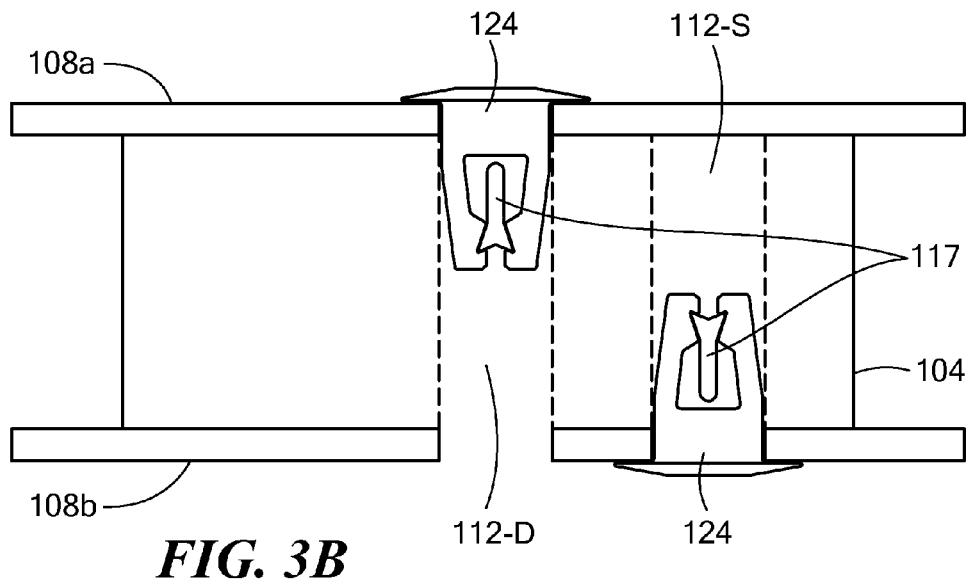

In another embodiment of the present invention, the latches 117 are provided within the latch opening 112 of the hub 104 to allow for insertion of one fastener 124 per latch opening 112, i.e., a single-ended latch opening 112-S. Thus, as shown in FIG. 3A, only one fastener 124 is provided within the latch opening 112-S to couple with a respective latch 117. As a result, as shown in FIG. 3B, twice as many single-ended latch openings 112-S would be necessary in the hub 104 as compared to the number of double-ended latch openings 112-D in a hub 104 as shown in FIGS. 2A and 2B.

Advantageously, the single-ended latch opening 112-S may be used for reels that require a hub 104 that is thinner than a certain amount, i.e., one where the fasteners 124 would otherwise interfere with each other and, therefore, would limit how thin the core can be. By placing a fastener 124 in one opening 112-S from one side and a fastener 124 from the other side into a separate opening 112-S, the hub 104 can be made with, for example, only half the thickness of what would be needed to have two fasteners 124 inserted into a double-ended opening 112-D, i.e., one fastener 124 from each side. Of course, the thickness of the upper and/or lower flange 108a, 180b, would have to be taken into consideration.

Figure 4A:
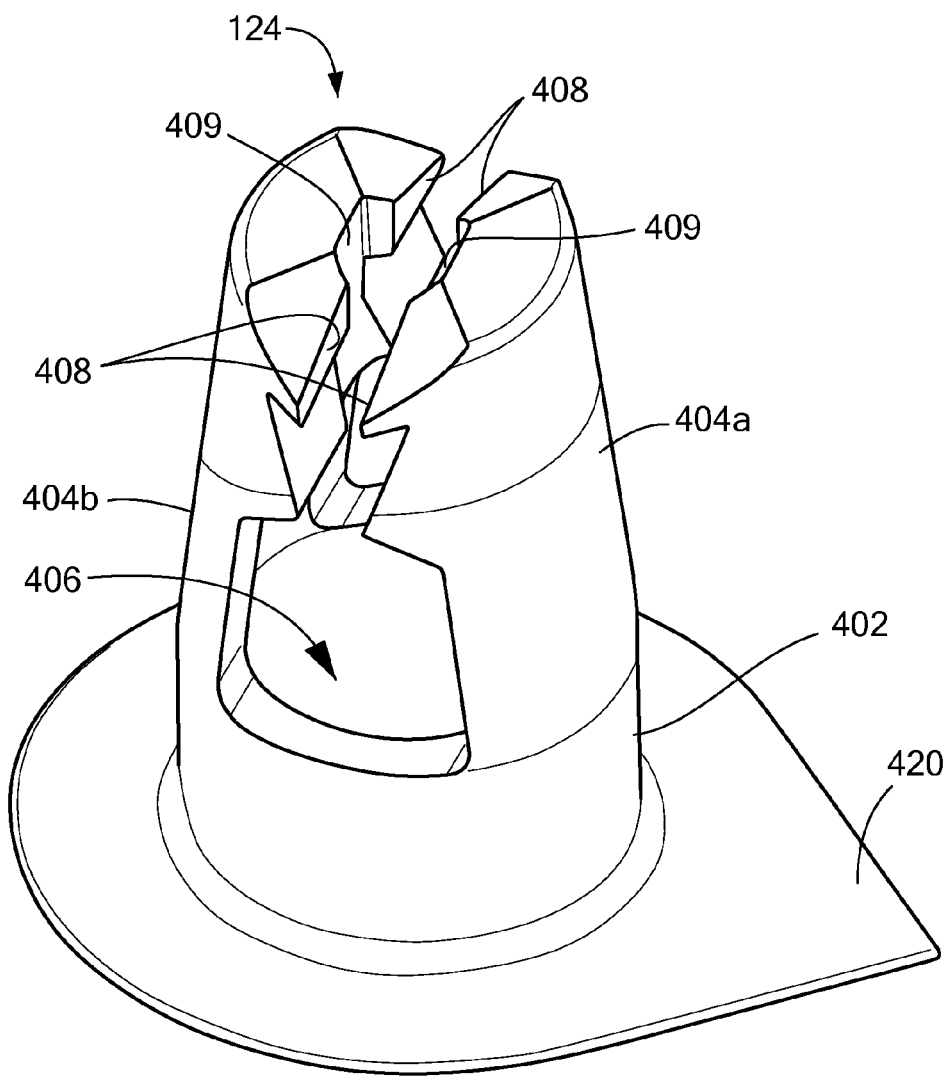
FIGS. 4A-4C are perspective views of a fastener in accordance with an embodiment of the present invention.
Figure 4B:
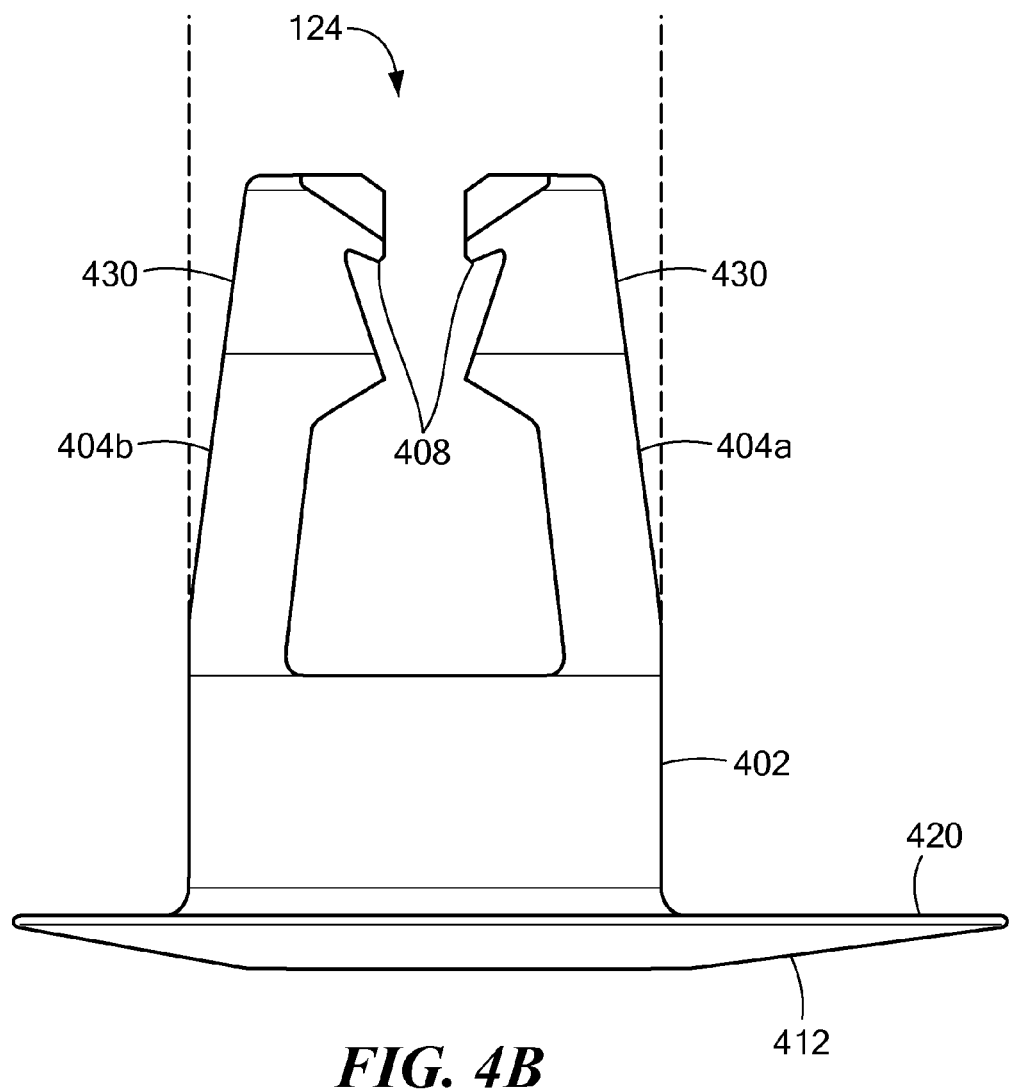
Figure 4C:
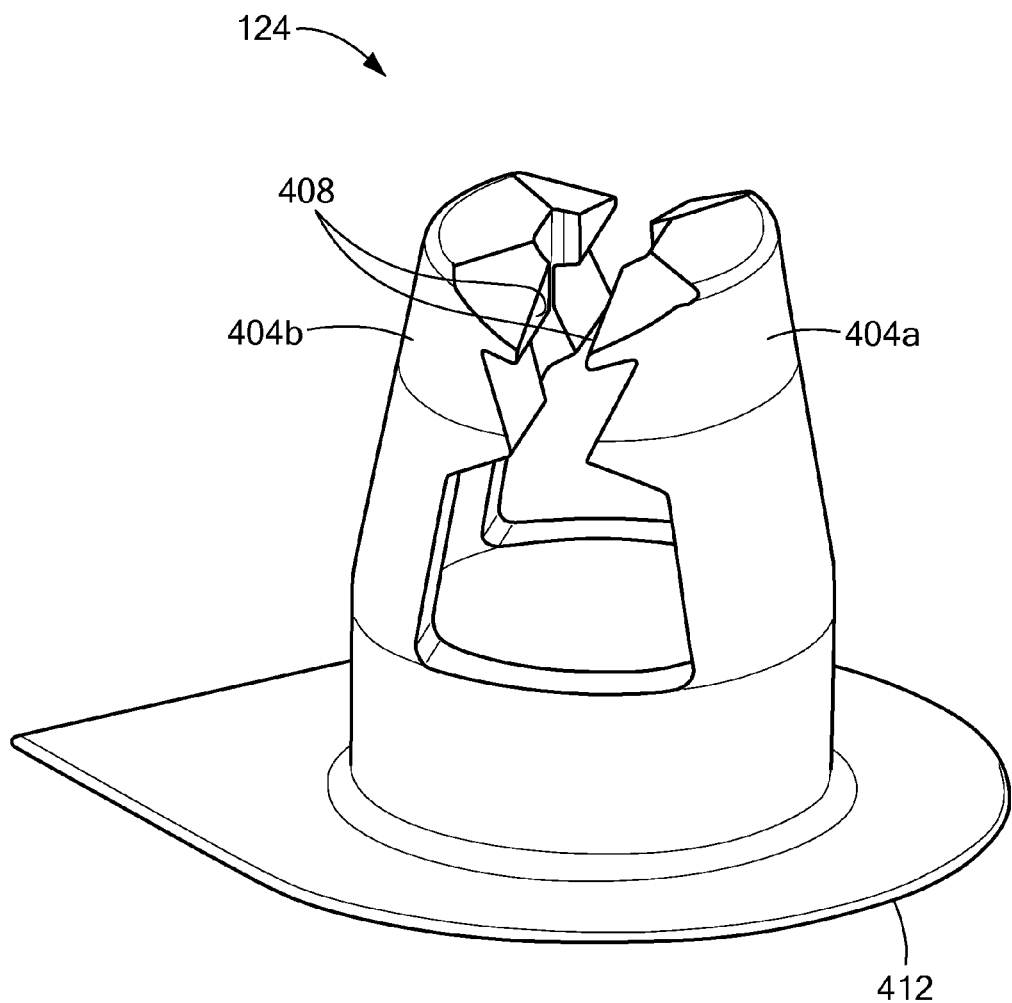

Referring now to FIGS. 4A-4C, a fastener 124 includes a cap or rim 412, connected to a hollow cylindrical body or base portion 402. The cap 412 may be integral with the body 402 or a separate part that is attached to the body 402. Two identical prongs or engaging structures 404a, 404b extend from the cylindrical body 402 and are in opposition to one another. An opening 406 runs through the cylindrical body 402 with a corresponding hole in the extension rim 412. Each prong 404a, 404b includes teeth 408 disposed about a removal tool guide portion 409. The fastener 124 may be made from a plastic or similar material that provides sufficient strength and deformation characteristics and that retains its flexibility.

As shown in FIG. 4B, each prong 404a, 404b, includes an inwardly slanted surface 430 that provides for a diameter that is less than a diameter of the hollow cylindrical body portion 402 (as represented by the dotted lines) of the fastener 124. As will be discussed in more detail below, the slanted surfaces 430 provide the fastener 124 with the ability to be removed from an opening 112 in which the fastener 124 is placed with a close slide fit to the body portion 402.

The cap 412 may include a cap index feature 420 such as the illustrated pointed portion in the cap 412. The cap index portion 420 allows for discerning a visual and/or tactical orientation of the fastener 124 to aid in aligning the fastener 124 to the latching features 115 in the opening 112 in the hub/core. As will be described in more detail below, the fastener 124 aligns with the latch 117 in the opening 112. To aid in alignment, the fastener 124 includes a surface to self-align the prongs if inserted with a slight misalignment. While it is not too difficult to pay attention to the orientation of the prongs 404a, 404b on the fastener 124 when inserting it, including the cap index portion 420 provides an easier and more efficient mechanism to do so. Thus, the cap index portion 420 allows an operator to more easily orient the fastener 124 without having to look at the prongs 404a, 404b before inserting it. As one of ordinary skill in the art knows, assembly time is part of the cost, so the cap index portion 420 can be used to reduce assembly time, errors and overall cost.

One of ordinary skill in the art will also understand that the cap index portion 420 implemented as a point on an otherwise round cap is just one example. It is considered that the cap index portion 420 could be a square tab, an arrow, a visual marking on the cap 412, a notch, a hole and any other like marking or physical differentiation from the other part of the cap 412.

Figure 5A:
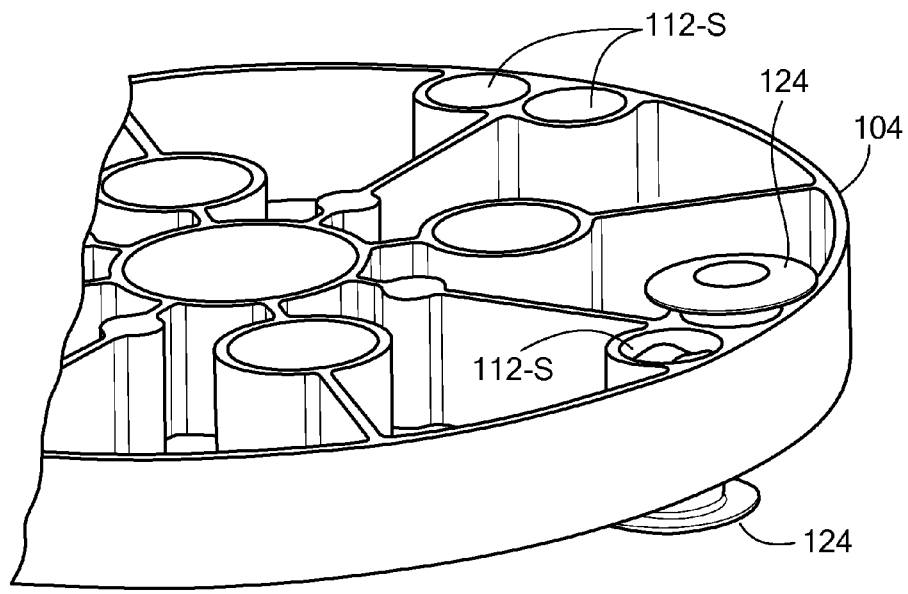
FIGS. 5A-5C are perspective and cutaway views of a fastener in an assembly in accordance with an embodiment of the present invention.

Referring now to FIG. 5A, in one embodiment of the present invention, the hub 104 is an open framework structure including a number of spokes with a plurality of single-ended latch openings 112-S provided within the framework. Each latch opening 112-S is a precision hole sized to provide a close slide fit to the hollow cylindrical body 402 of the fastener 124. The open framework structure provides for a lightweight hub 104 as it requires less material as compared to a solid hub. As shown in FIG. 5A, the hub 104 includes latches 117, not shown, with the single-ended latch openings 112-S arranged in pairs such that the fasteners 124 may be inserted from opposite sides in order to retain the upper and lower flanges 108a and 108b, also not shown. The arrangements of the single-ended latch openings 112-S in pairs is just one example and one of ordinary skill in the art would understand that the layout of the single-ended latch openings 112-S is a design choice determined by the needs of the implementation.

It should be noted that the hub 104 could be made from a solid piece of material with the latch openings 112 provided therein. Generally, the hub 104 is the carrier for the latch openings 112 and the framework embodiment above is merely shown as one example. The hub material could be any material known to those of ordinary skill in the art.

Figure 5B:
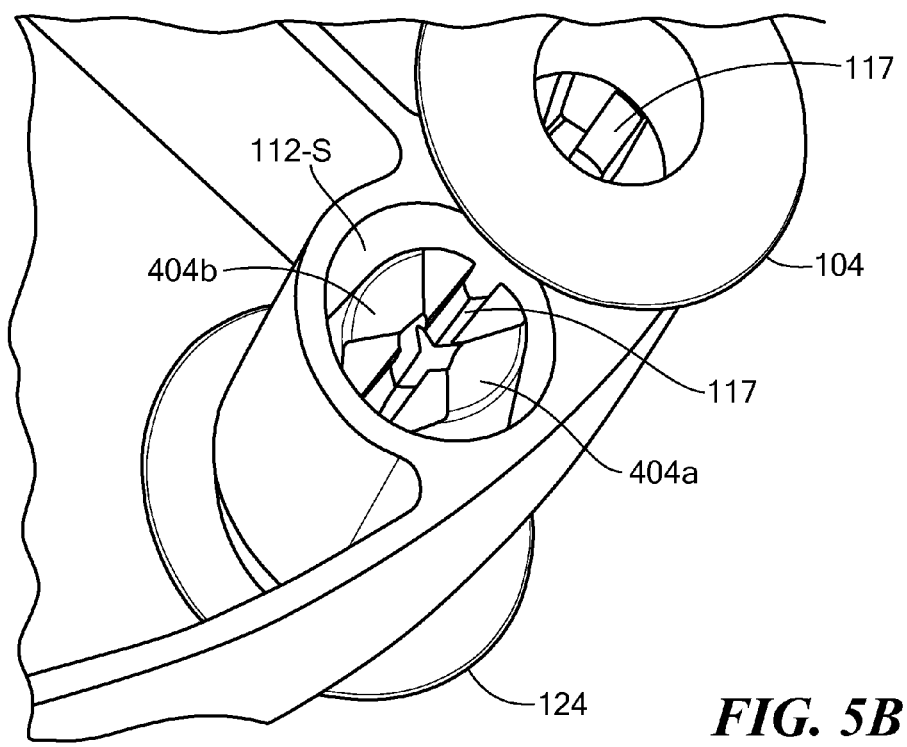
Figure 5C:
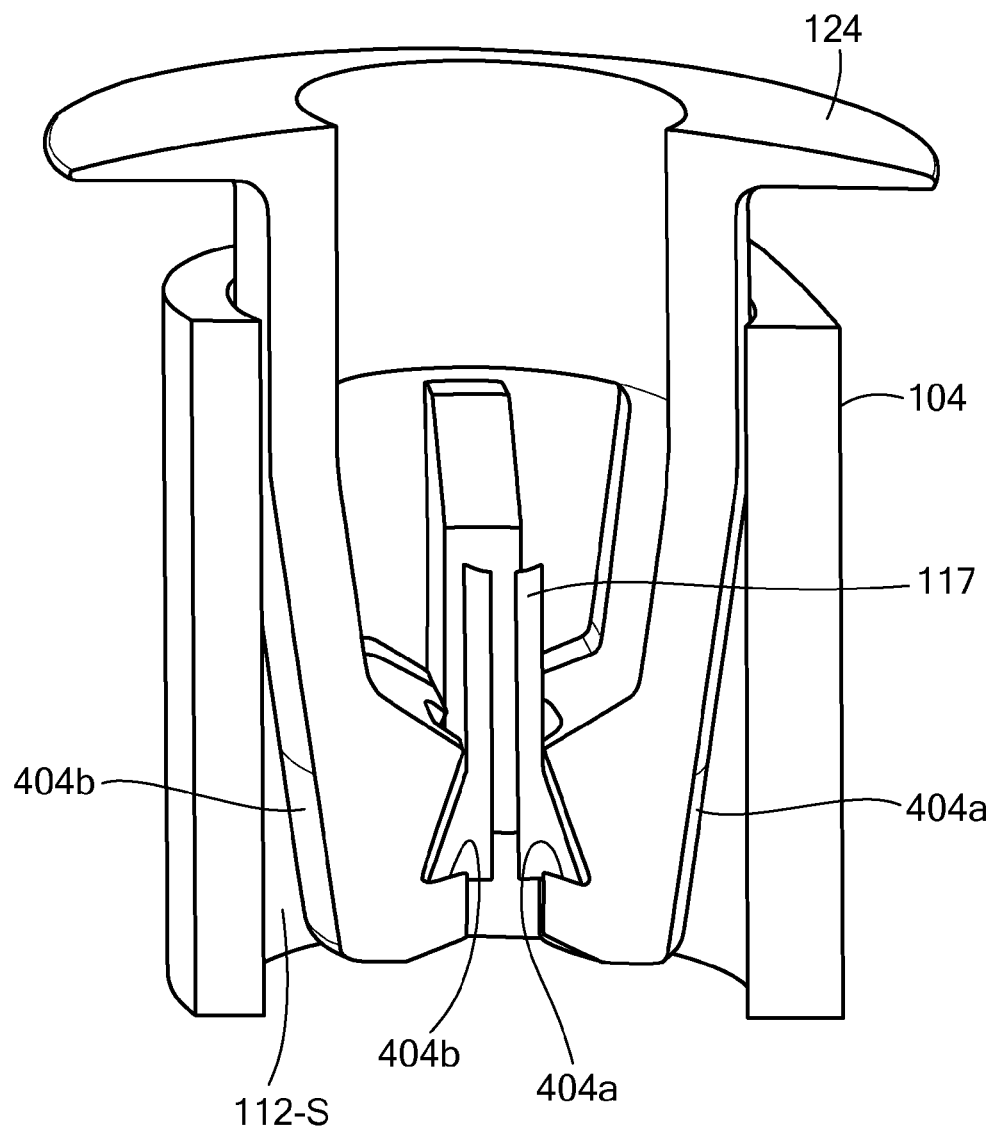

Referring to FIG. 5B, a close-up of the embodiment shown in FIG. 5A, the coupling of the fasteners 124 to the respective latch 117 is presented. Further, the coupling of the fastener 124 to the latch 117 is shown in the cutaway view as presented in FIG. 5C.

Figure 6A:
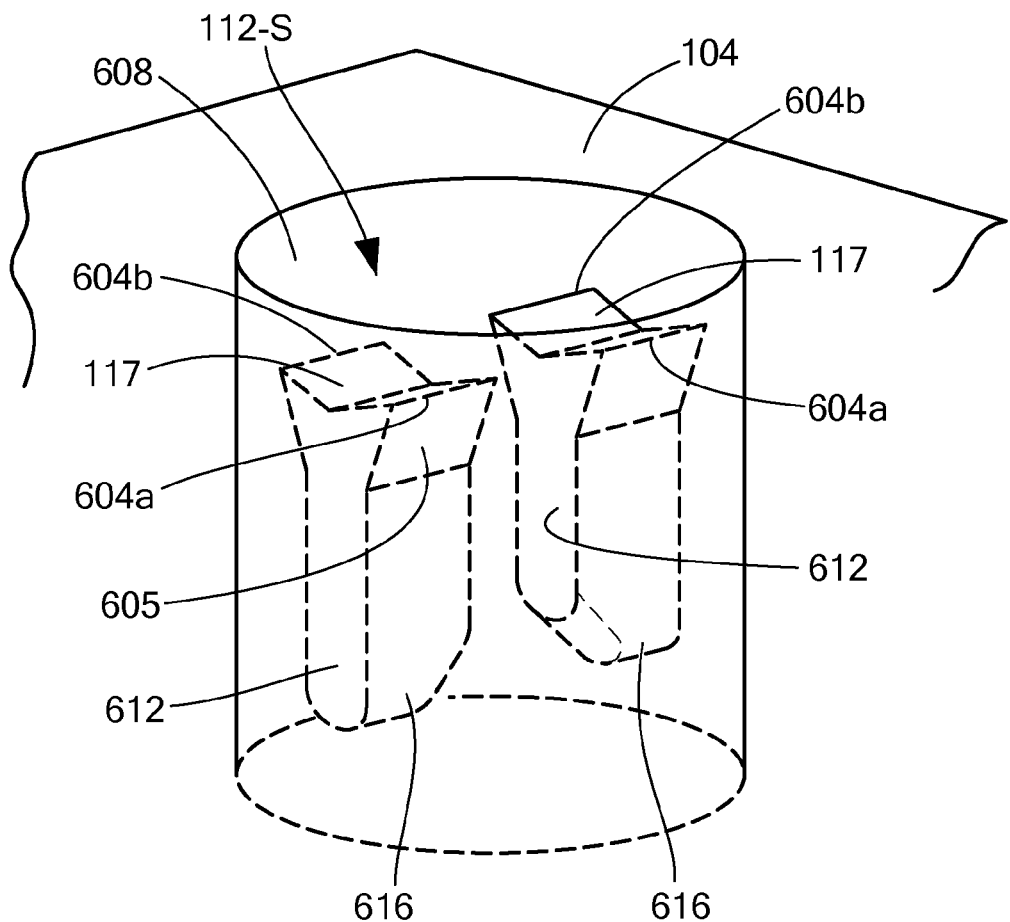
FIGS. 6A and 6B are perspective and cutaway views of a core in accordance with an embodiment of the present invention.
Figure 6B:
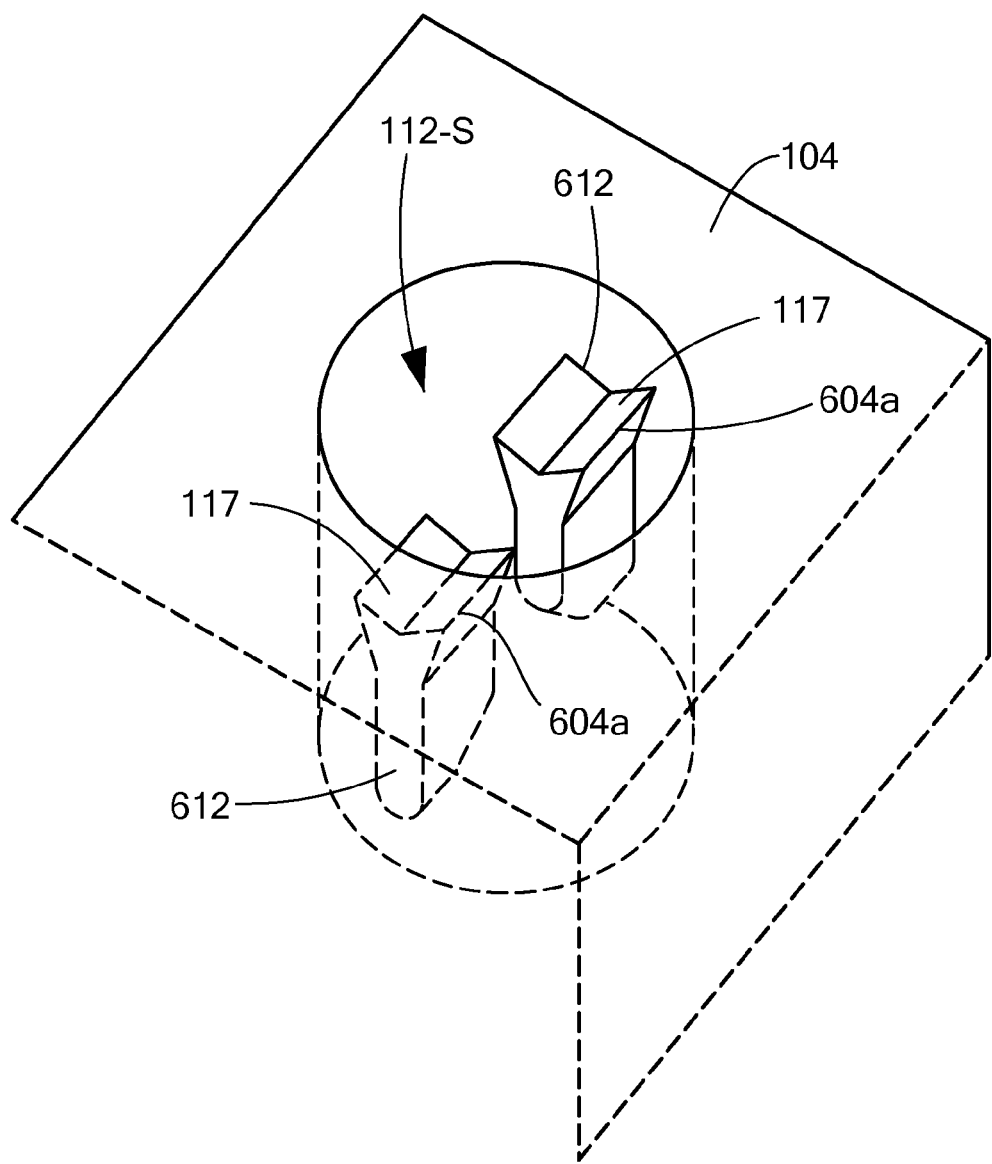

The latch 117 includes two portions disposed in a latch opening 112 of a hub 104, as shown in FIGS. 6A and 6B. Each of the spaced apart latches 117 is disposed on a latch opening wall 608 and extends into the latch opening 112. Each of the latches 117 includes a pair of oppositely disposed latch flanges 604a and 604b that extend from a body 612 of the latch 117. In one embodiment, the hub 104 is created by an injection molding process and, therefore, the latches 117 are integral with the hub 104. Of course, there are other mechanisms for providing the latching features which is understood to one of ordinary skill in the art.

Figure 7A:
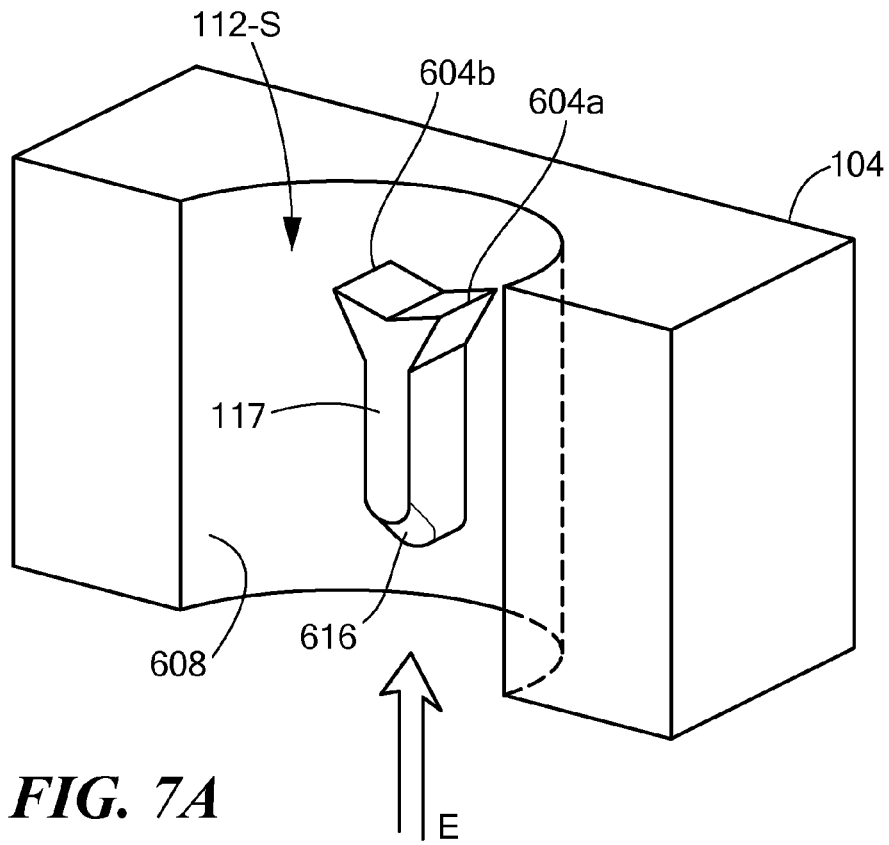
FIGS. 7A and 7B are alternate perspective and cutaway views of a core in accordance with an embodiment of the present invention.
Figure 7B:
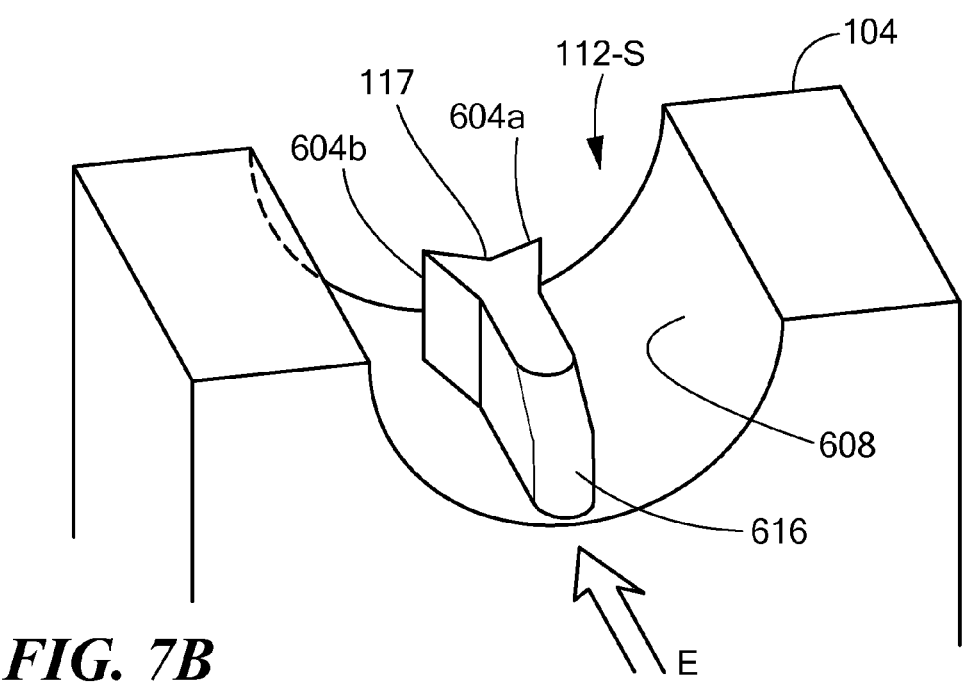

Further, each of the latches 117 includes a lead portion 616 as that is the end from which the fastener 124 will first come into contact with the latch 117. Generally, each fastener 124 approaches along a direction identified by the large arrow E, as shown in FIGS. 7A and 7B, which are perspective cutaway views of one of the latches 117 in accordance with an embodiment of the present invention.

Figure 8:
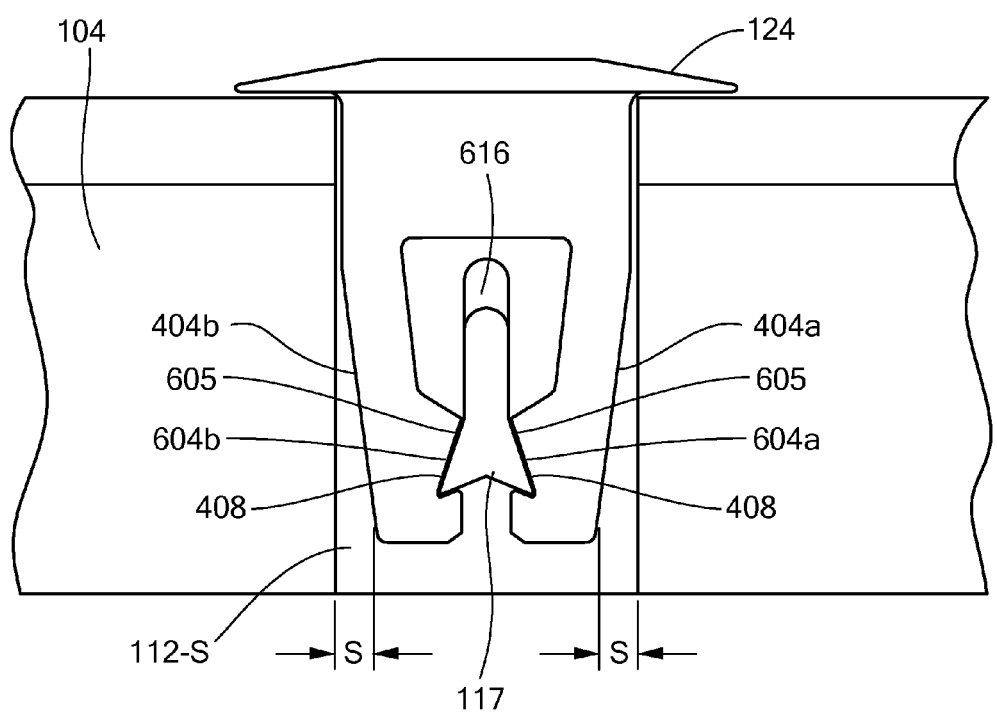
FIG. 8 is a cutaway view of a fastener coupled to a core in accordance with an embodiment of the present invention.

Referring now to FIG. 8, when the fastener 124 is introduced into the latch opening 112, the prongs 404a, 404b are guided along the lead portion 616 and along a ramp portion 605 of each of the latch flanges 604a, 604b. The slanted surfaces 430 of the prongs 404a, 404b, provide a space S from the wall of the opening 112 and, as the fastener 124 is made from a flexible material, the prongs 404a and 404b will spread apart by operation of the movement along the ramps 605 and, when pressed past the latch flanges 604a and 604b, the corresponding teeth 408 will connect with the latch flanges 604a, 604b and the prongs 404a and 404b will snap back and the fastener 124 will be coupled to the latch 117. The space S not only allows for insertion and connection of the fastener 124 into an opening 112 with almost the same diameter as the portion 402 but also allows for its removal, as discussed below. Advantageously, the slanted surfaces 430 allow for the prongs of the fastener 124 to be expanded without exceeding the diameter of the opening in which the fastener is placed, i.e., without exceeding the diameter of the body portion 402.

Figure 9A:
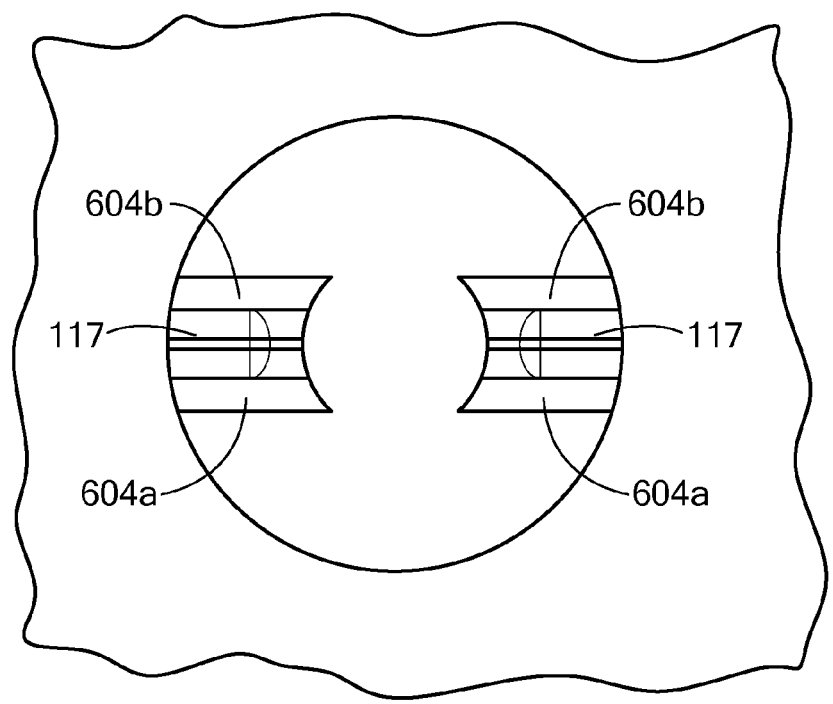
FIGS. 9A and 9B are a top-view and cross-sectional view of a latching feature in accordance with an embodiment of the present invention.
Figure 9B:
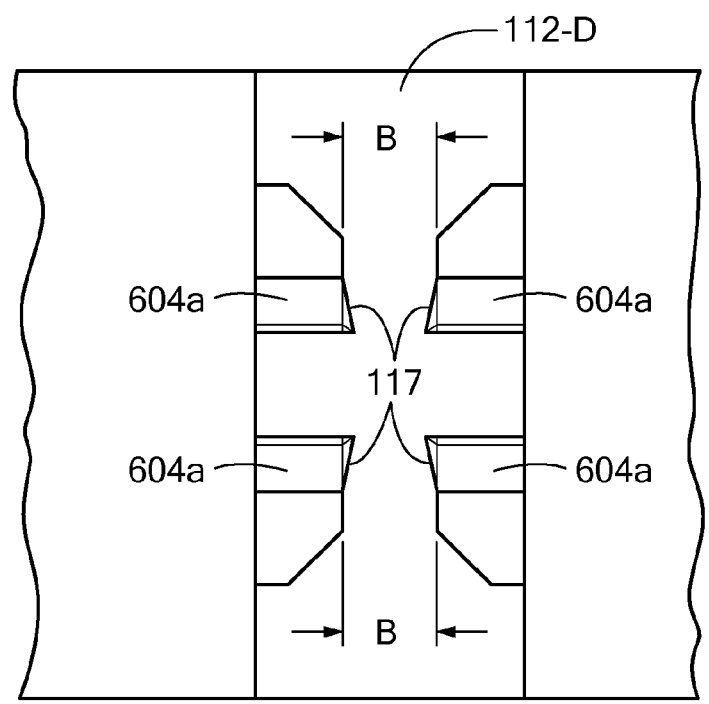
Figure 10:
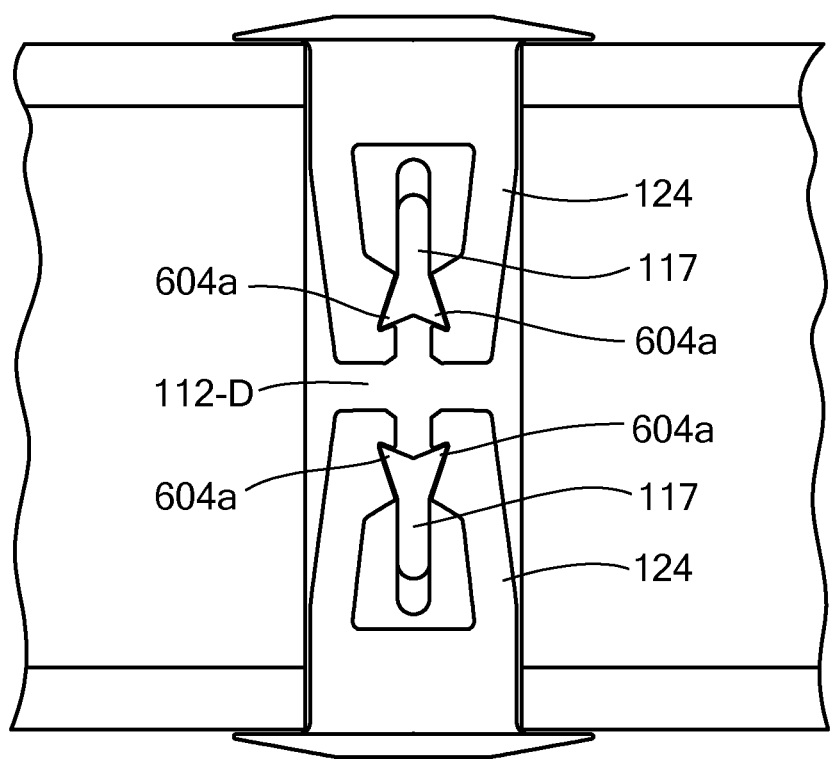
FIG. 10 is a cross-sectional view of two fasteners coupled to a latching feature.

The placement of the latches 117 to provide a double-ended latch opening 112-D is shown in FIGS. 9A, 9B and 10. Here, the latches 117 are arranged to be releasably coupled to a respective fastener 124 inserted from each side of the opening 112-D. The space B between the latches 117 allows for a removal tool to be used, as will be described below. One of ordinary skill in the art will understand that there are various forms that the latch 117 could take and the one shown is merely meant to be illustrative of the concepts of the invention.

Advantageously, the foregoing embodiments allow for using cores of any thickness with a single size fastener 124. As described above, when the core 104 is below a certain thickness, the singled-ended openings 112-S may be used as shown in FIGS. 3A and 3B, for example. When a thicker core is being implemented, however, a longer fastener 124 is not needed as the latching feature 115, for example, the latch 117, need only be placed the correct distance from the outer surface for any core thickness. As mentioned above, the thickness of the flanges would also be taken into consideration for placement.

Figure 11:
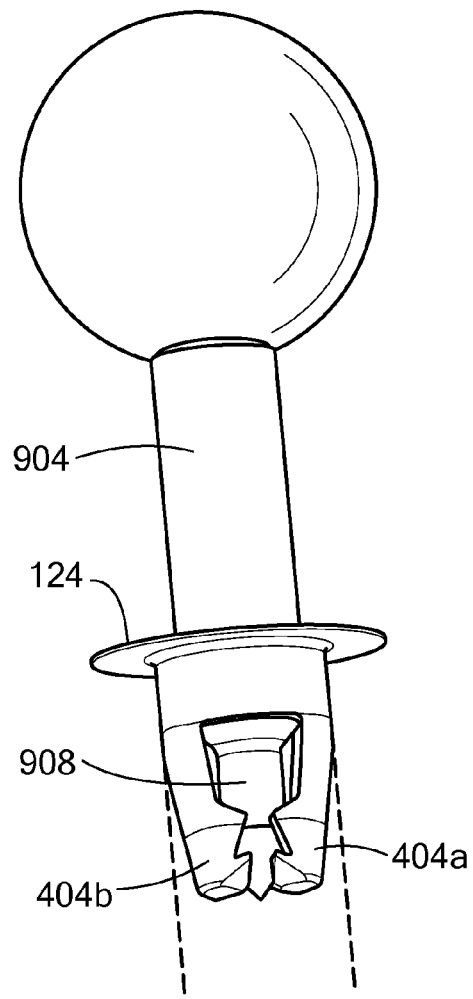
FIG. 11 is a perspective of a removal tool inserted in a fastener in accordance with an embodiment of the present invention.
Figure 12:
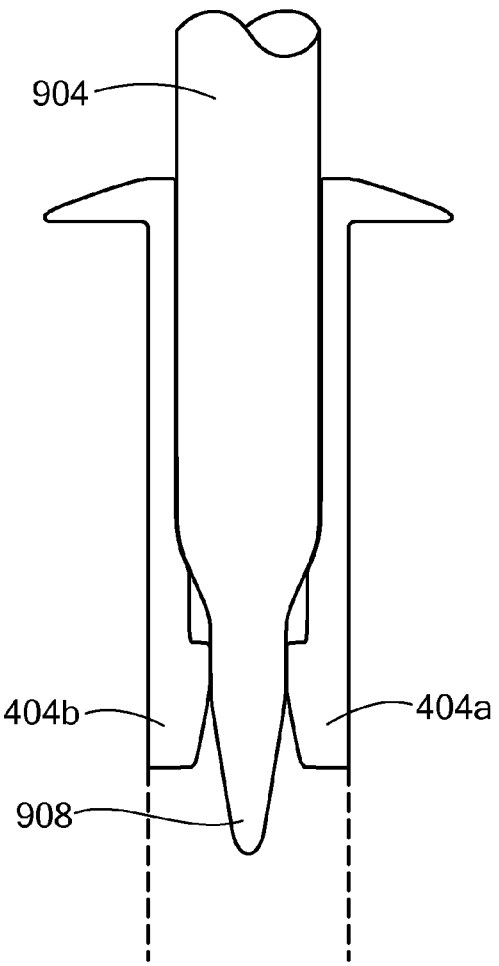
FIG. 12 is a cutaway view of the removal tool inserted in the fastener shown in FIG. 11.

Referring now to FIGS. 11 and 12, in order to disengage a fastener 124 from a latching feature 115, a removal tool 904 is pushed through the opening in the fastener 124. As above, when in a connected position, the prongs 404a, 404b have a diameter between them that is less than the diameter of the opening, as represented by the dotted lines. A distal tool tip portion 908 of the removal tool 904, when inserted through the hole in the extension rim 412 of the fastener 124, will cause the prongs 404a, 404b to spread apart and disengage from the latching feature 115. The space S is large enough to allow for the disengaging of the fastener 124 from the latching feature 115 and the fastener 124 can then be removed from the opening 112. The tool tip portion 908 is curved and sized to slide along the portions of the prongs 404a, 404b and causes them to expand or widen from one another as shown in FIG. 10. As the prongs 404a, 404b widen, they disengage from the latching feature 115.

Figure 13:
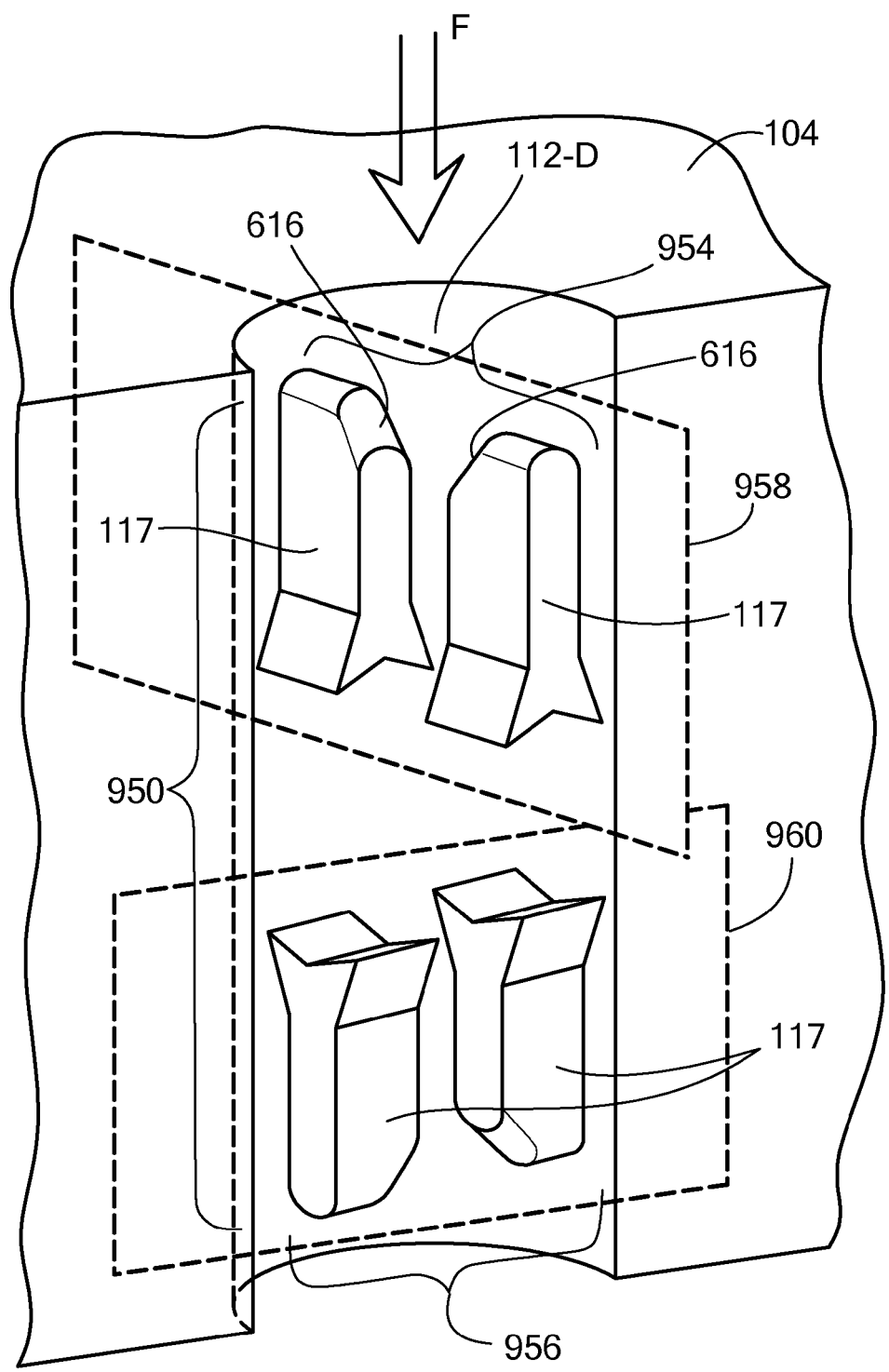
FIG. 13 is a cutaway, perspective view of a core with a transverse latching feature in accordance with an embodiment of the present invention.

In another embodiment of the present invention, a transverse latch arrangement 950, as shown in FIG. 13, includes two pairs 954, 956 of latches 117 that are provided in the double-ended opening 112-D in the core 104. Each of the latches 117 in each pair 954, 956 of latches are aligned in a respective virtual plane 958, 960. The pairs 954, 956 of latches 117 are transverse, i.e., substantially perpendicular, to each other in that the respective virtual planes 958, 960 are perpendicular to one another. It should be noted that the virtual planes 958, 960 are only used to aid in describing embodiments of the present invention and do not represent structural features. Advantageously, the transverse latch arrangement 950 allows for using a fastener 124 from each side of the core 104 and in the same opening 112-D. Further, this transverse latch arrangement 950 can be molded into the opening 112-D of the core 104 in a straightforward manner.

Figure 14:
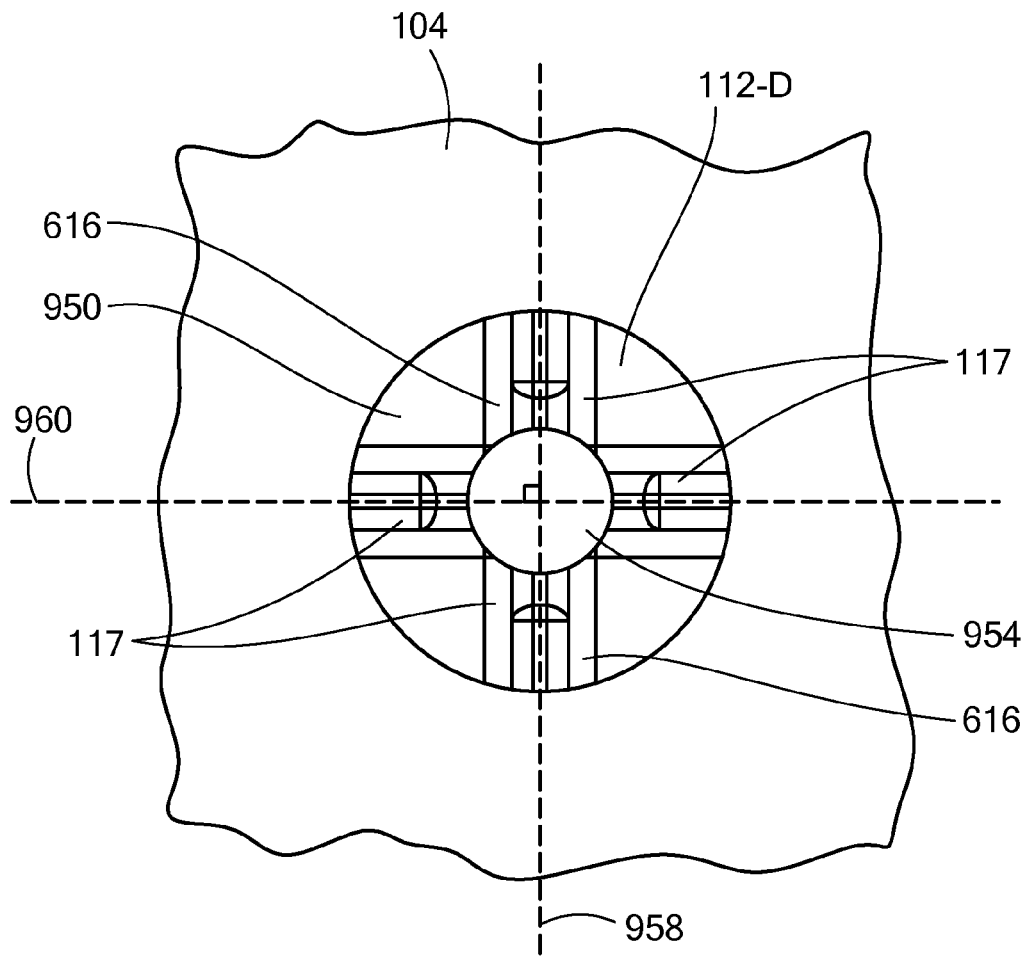
FIG. 14 is a top view of the core shown in FIG. 13.

The transverse aspect of the arrangement 950 can be seen in FIG. 14, which is a view down through the opening 112-D along the arrow F in FIG. 13. As can be seen, a space 954 created by the latches 117 can be used to receive the removal tool 904 and operate as has been described above.

Figure 15:
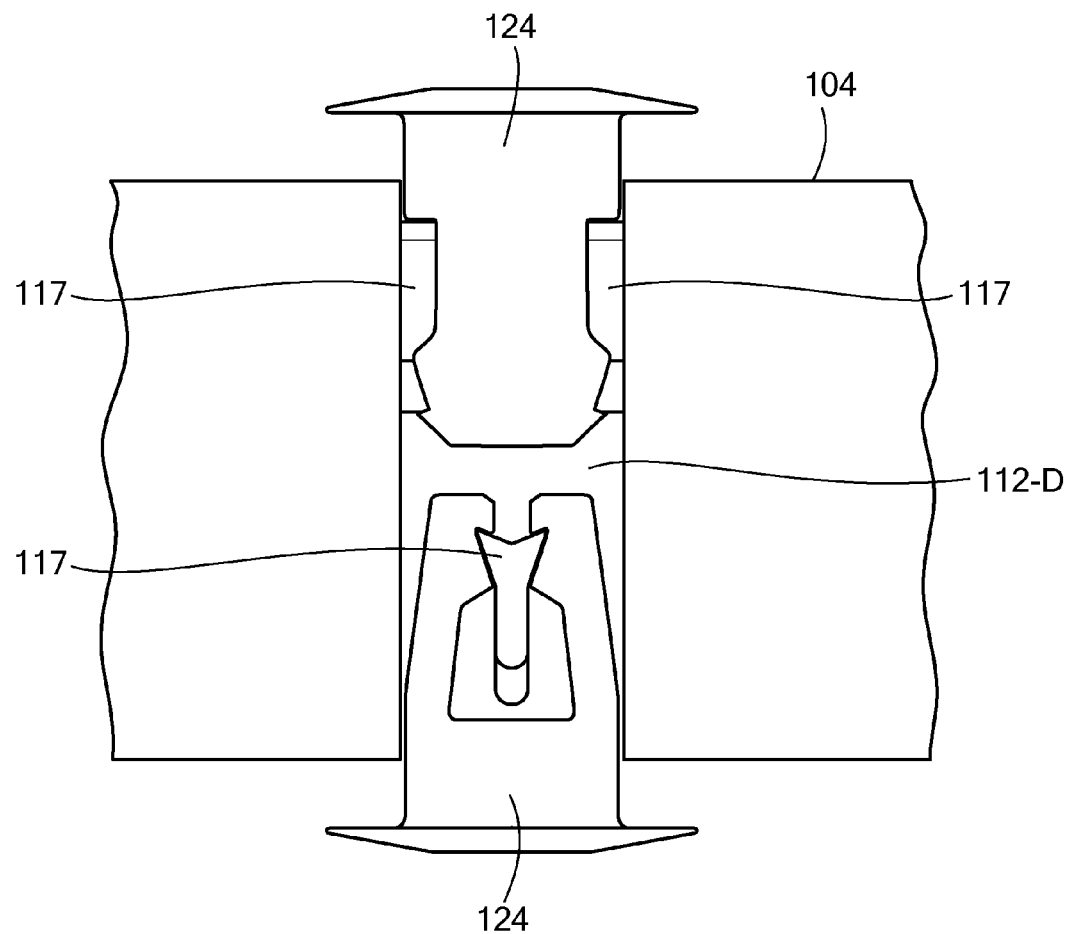
FIG. 15 is a cross-sectional view of two fasteners coupled to the transverse latching feature of FIG. 13.

The connection of the fasteners 124 to the transverse latch 950, as shown in FIG. 15, is similar to that which has been described above. Generally, a properly sized fastener 124 is inserted from each side of the core 104 to couple with a respective pair of latches 117. Operation of the removal tool 904 is also, therefore, the same.

Figure 16:
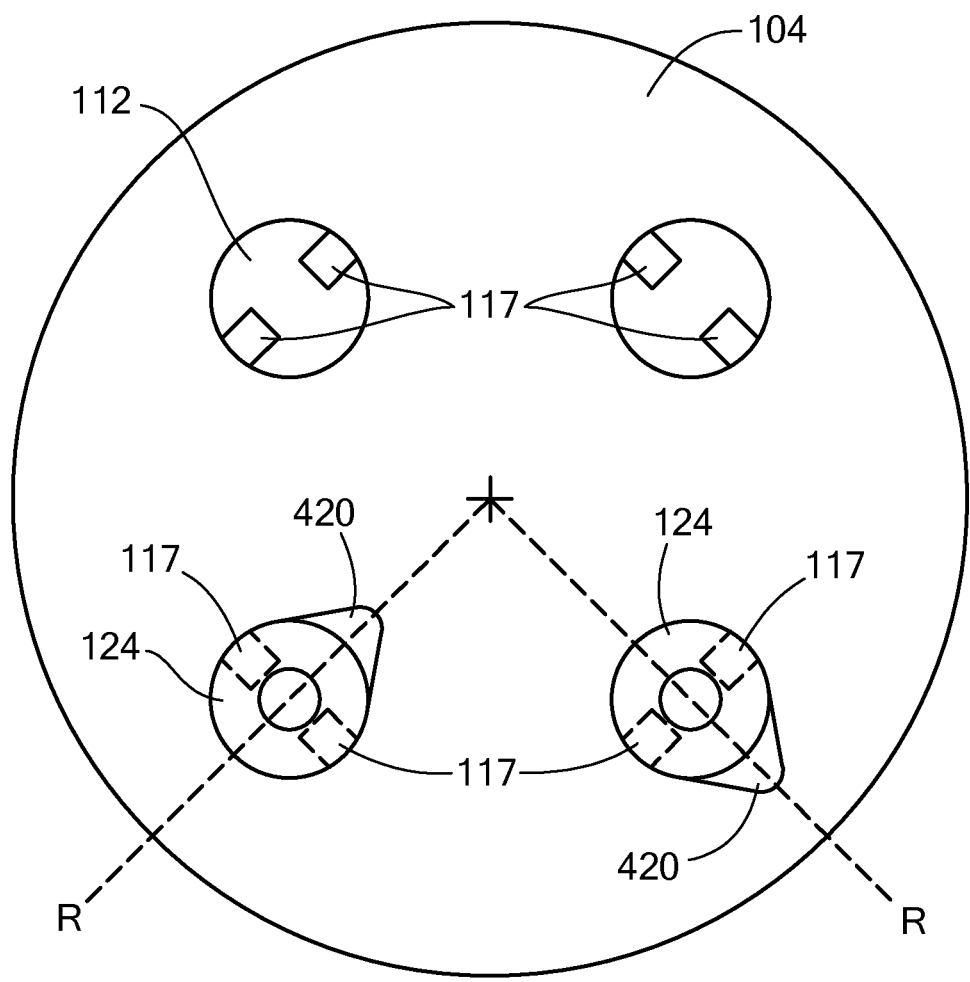
FIG. 16 is a top view of the core with oriented fasteners installed therein.

As shown in FIG. 16, the orientations of the latches 117 in the latch opening 112 in the hub 104 may be standardized such that, for example, the cap index portion 420 of an inserted fastener 124 is always oriented toward the center of the hub 104 in order to engage with the latch. Of course, as the fastener 124 is symmetrical, i.e., there are two orientations that will couple to the latch, the cap index portion 420 would have two directions in which it could point, in this case, toward or away from the hub. Thus, as shown in FIG. 16, the core 104 includes a plurality of latch openings 112-D with, for example, latches 117 oriented such that the cap index portion 420 of the fastener 124 points either towards or away from a center of the core 104 along a radius R. One of ordinary skill in the art will understand that the latches 117 or the two pairs 954, 956 of latches 117 could each be oriented in a similar manner to provide the same results. Thus, any one of two directions for the orientation of the cap index portion 420 could be chosen and the example given is meant only for explanation. Advantageously, having two orientations for the cap index portion 420 provides opportunities for more efficient assembly as the fastener 124 could be inserted by feel without needing to look to correctly orient it.

The combination of a precision opening in the core that allows for a close slide fit of the fastener, as different from a "press-fit" which generally requires some resistance to insertion. The close fit of the cylindrical portions of the fasteners to the matching cylindrical opening in the hub/core and holes in the hub/core provides a robust reel assembly. Specifically, the connection of the fastener 124 within the opening 112 by operation of the close slide fit into the opening of the core/hub, and close fit holes for the fasteners in the flange, prevents the flange from having excessive freedom of movement in any direction of the plane of the flange.

Having thus described several features of at least one embodiment of the present invention, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A coupling system, comprising:
a hub having a first latch opening disposed therein and defining a first latch opening space;
a first latching feature disposed in the first latch opening and irremovably attached to, and extending from, an inner wall of the first latch opening into the first latch opening space; and
a first fastener, disposed in the first latch opening, comprising a first set of opposing prongs releasably coupled to the first latching feature positioned between the first set of opposing prongs,
wherein the first fastener is separate from the hub and configured to be completely removed from the first latch opening, and
wherein the first latch opening is sized to provide a close slide fit to a base portion of the first fastener.

2. The coupling system of claim 1, wherein:
the first latching feature is configured to releasably couple only to one fastener inserted from one side of the first latch opening.

3. The coupling system of claim 1, wherein:
the first latching feature is configured to couple to two fasteners at a same time, the two fasteners inserted, respectively, from opposite ends of the first latch opening.

4. The coupling system of claim 1, further comprising:
a second fastener, disposed in the first latch opening, comprising a second set of opposing prongs and releasably coupled to the first latching feature disposed between the second set of opposing prongs.

5. The coupling system of claim 1, wherein the hub further comprises a second latch opening disposed therein, the system further comprising:
a second latching feature disposed in the second latch opening; and
a second fastener, disposed in the second latch opening, comprising a second set of opposing prongs releasably coupled to the second latching feature positioned between the second set of opposing prongs.

6. The coupling system of claim 1, further comprising:
a first flange disposed adjacent the hub,
wherein a portion of the first flange is disposed between a portion of the first fastener and the hub.

7. The coupling system of claim 6, wherein the first flange comprises a first fastener opening defined therein, the first fastener opening coaxially aligned with the first latch opening, and
wherein the first fastener extends through the first fastener opening into the first latch opening.

8. The coupling system of claim 1, wherein the first latch opening extends through the hub and has a first opening on a first surface of the hub and a second opening on an opposing second surface of the hub.

9. The coupling system of claim 1, wherein the first latch opening does not extend through the hub and only has an opening on a first surface of the hub.

10. The coupling system of claim 1, further comprising:
a second latch opening disposed in the hub; and
a second latching feature disposed in the second latch opening,
wherein the first and second latching features are oriented in a predetermined manner with respect to a radius of the hub.

11. The coupling system of claim 10, wherein each of the first and second fasteners comprises an index portion.

12. The coupling system of claim 1, wherein:
each of the opposing prongs comprises a slanted surface such that a diameter across the distal portions of the prongs is less than a diameter of the first latch opening.

13. The coupling system of claim 1, wherein:
the opposing prongs of the first fastener are configured to be sufficiently separated from one another, when a removal tool is inserted between them, to facilitate the release of the first fastener from the first latching feature and the removal of the first fastener from the first latch opening.

14. A coupling system, comprising:
a hub having first and second latch openings disposed therein and defining first and second latch opening spaces, respectively;
a first latching feature disposed in the first latch opening and extending from an inner wall of the first latch opening into the first latch opening space;
a second latching feature disposed in the second latch opening and extending from an inner wall of the second latch opening into the second latch opening space; and
first and second fasteners disposed, respectively, in the first and second latch openings and releasably coupled to the first and second latching features,
wherein the first fastener is positioned in the first latch opening from a first side of the hub,
wherein the second fastener is positioned in the second latch opening from a second side of the hub opposite the first side of the hub, and
wherein the first and second fasteners are separate from the hub and configured to be completely removed from the first and second latch openings, respectively.

15. The coupling system of claim 14, wherein:
each of the first and second latching features is configured to releasably couple only to one fastener from one side of the first latch opening.

16. The coupling system of claim 14, wherein:
the hub comprises radially extending spokes, and
wherein the first and second latch openings are attached to a same spoke of the hub.

17. The coupling system of claim 14, wherein the first and second latching features are oriented in a predetermined manner with respect to a radius of the hub.

18. The coupling system of claim 17, wherein each of the first and second fasteners comprises an index portion.

19. The coupling system of claim 14, wherein:
each of the first and second fasteners comprises a set of opposing prongs configured to releasably engage the first and second latching features, respectively.

20. The coupling system of claim 19, wherein:
each of the opposing prongs comprises a slanted surface such that a diameter across the distal portions of the set of opposing prongs is less than a diameter of the respective latch opening.

21. The coupling system of claim 19, wherein:
the opposing prongs of each of the first and second fasteners are configured to be sufficiently separated from one another, when a removal tool is inserted between them, to facilitate the release of the respective fastener from the respective latching feature and the removal of the respective fastener from the respective latch opening.

22. The coupling system of claim 14, wherein each latch opening is sized to provide a close slide fit to a base portion of the respective fastener.

23. The coupling system of claim 14, wherein each of the first and second latching features is configured to releasably couple to a respective fastener by being positioned in a space located between a pair of opposing prongs of the fastener.

24. The coupling system of claim 14, wherein each of the first and second fasteners comprises a set of opposing prongs releasably coupled to the respective first and second latching feature positioned therebetween.

25. A coupling system, comprising:
a hub having a first latch opening disposed therein;
a first pair of latching features disposed in the first latch opening, the first pair of latching features arranged in a first virtual plane; and
a second pair of latching features disposed in the first latch opening, the second pair of latching features arranged in a second virtual plane,
wherein each of the first and second pairs of latching features is irremovably attached to, and extending from, an inner wall of the first latch opening,
wherein each of the first and second pairs of latching features is configured to releasably couple to a fastener by being positioned in a space located between a pair of opposing prongs of the fastener, and
wherein the first and second virtual planes intersect.

26. The coupling system of claim 25, wherein the first and second virtual planes are perpendicular to one another.

27. The coupling system of claim 25, wherein an angle between the first and second virtual planes is less than 90°.

28. The coupling system of claim 25, further comprising:
a first fastener disposed in the first latch opening having a first pair of opposing prongs releasably coupled to the first pair of latching features.

29. The coupling system of claim 28, further comprising:
a second fastener disposed in the first latch opening and comprising a second pair of opposing prongs releasably coupled to the second pair of latching features disposed between the second set of opposing prongs.

30. The coupling system of claim 28, wherein:
each of the opposing prongs comprises a slanted surface such that a diameter across the distal portions of the prongs is less than a diameter of the first latch opening.

31. The coupling system of claim 28, wherein the first latch opening is sized to provide a close slide fit to a base portion of the fastener.

32. The coupling system of claim 28, wherein:
the opposing prongs of each of the first and second fasteners are configured to be sufficiently separated from one another, when a removal tool is inserted between them, to facilitate the release of the respective fastener from the respective latching feature and the removal of the respective fastener from the respective latch opening.

33. The coupling system of claim 25, wherein the first pair of latching features is configured to releasably couple only to one fastener inserted from one side of the first latch opening.

34. A coupling system kit, comprising:
a hub having a first latch opening disposed therein;
a first pair of latching features disposed in the first latch opening, the first pair of latching features arranged in a first virtual plane;
a second pair of latching features disposed in the first latch opening, the second pair of latching features arranged in a second virtual plane;
a first fastener configured to be disposed in the first latch opening and comprising a first set of opposing prongs to releasably couple to one of the first and second pairs of latching features disposed between the first set of opposing prongs; and
a flange configured to be positioned between the first fastener and the hub.

* * * * *